United States Patent [19]

Bowler et al.

[11] 3,765,701

[45] Oct. 16, 1973

[54] VEHICLE OCCUPANT RESTRAINING BELT SYSTEM

[75] Inventors: Lauren L. Bowler, Bloomfield Hills; Theodore M. Salamon, Warren; Frank J. Winchell, Orchard Lake, both of Mich.

[73] Assignee: General Motors Corporation, Detroit, Mich.

[22] Filed: Dec. 23, 1971

[21] Appl. No.: 211,290

[52] U.S. Cl. .......................................... 280/150 SB
[51] Int. Cl. ............................................... B60r 21/02
[58] Field of Search .............................. 280/150 SB

[56] References Cited
UNITED STATES PATENTS

| | | | |
|---|---|---|---|
| 3,506,083 | 4/1970 | Botnick | 280/150 SB |
| 3,351,382 | 11/1967 | Davies | 280/150 SB |
| 3,583,726 | 6/1971 | Lindblad | 280/150 SB |

Primary Examiner—Robert R. Song
Attorney—W. E. Finken et al.

[57] ABSTRACT

A belt has one end fixed to the door adjacent the free swinging edge thereof and the other end mounted on an inertia retractor secured to the roof rail. A D-ring is slidably received on the belt intermediate the ends and may be either engaged with a stow latch assembly mounted on the roof forwardly of the seat to position the belt for ease of occupant ingress and egress when the door is opened or may be inserted into a buckle mounted adjacent a lower inboard portion of the seat positioning the belt for occupant restraint when the door is closed with that portion of the belt between the D-ring and the door across the occupant's lap and that portion between the buckle and the roof mounted retractor across the occupant's chest. The stow latch assembly includes a pair of rotationally mounted and spring biased apertured discs, one of which has teeth which extend into the aperture of the D-ring to releasably retain the belt system in easy-enter position.

2 Claims, 4 Drawing Figures

Patented Oct. 16, 1973

INVENTORS
Lauren L. Bowler,
Theodore M. Salamon,
BY & Frank J. Winchell

Herbert Furman
ATTORNEY

Patented Oct. 16, 1973

INVENTORS
Lauren L. Bowler,
Theodore M. Salamon,
BY E. Frank J. Winchell

Herbert Furman
ATTORNEY

VEHICLE OCCUPANT RESTRAINING BELT SYSTEM

The invention relates to a vehicle occupant restraining belt system.

It is known to provide an occupant restraining belt system in which lap and shoulder belts respectively have one end attached adjacent an outboard lower area of the seat and to the roof siderail with the other ends thereof having D-rings received in buckles mounted inboard the seat. It is also known to provide a passive vehicle occupant restraining belt system in which closure of the vehicle door in cooperation with the action of a seat belt retractor positions the lap and shoulder belts about the seated occupant.

The present invention provides a vehicle occupant restraining system in which an inertia retractor and the occupant performed actions of closing the door and buckling the seat belt are effective to position the belt to restrain the seat occupant.

The invention also provides a vehicle occupant restraining belt system which is retained in an easy-enter position by engagement of the seat belt D-ring assembly with a stow latch assembly mounted on the roof forwardly of the occupant.

The invention teaches a single length of seat belt, one end of which is attached to the door adjacent the free swinging edge thereof and the other end of which is mounted on an inertia retractor mounted on the roof outboard of the seat. A D-ring slidably engages the belt intermediate its ends to define lap and shoulder belt portions thereof and may be engaged with a stow latch assembly mounted on the windshield header in the area of a sun visor so that when the vehicle door is opened, the belt assumes an easy-enter position in which the path of occupant entry into and exit from the seat is unobstructed. Upon entering the seat and closing the door, the seated occupant removes the D-ring from the stow latch assembly and inserts it into a buckle mounted on the vehicle floor inboard the seat so that the belt assumes an occupant restraining position with that portion of the belt between the door and the D-ring positioned across the occupant's lap while that portion of the belt between the retractor and the D-ring is positioned across the occupant's chest.

These and other features of the invention will be readily apparent upon consideration of the following detailed description and drawings in which.

Figure 1:
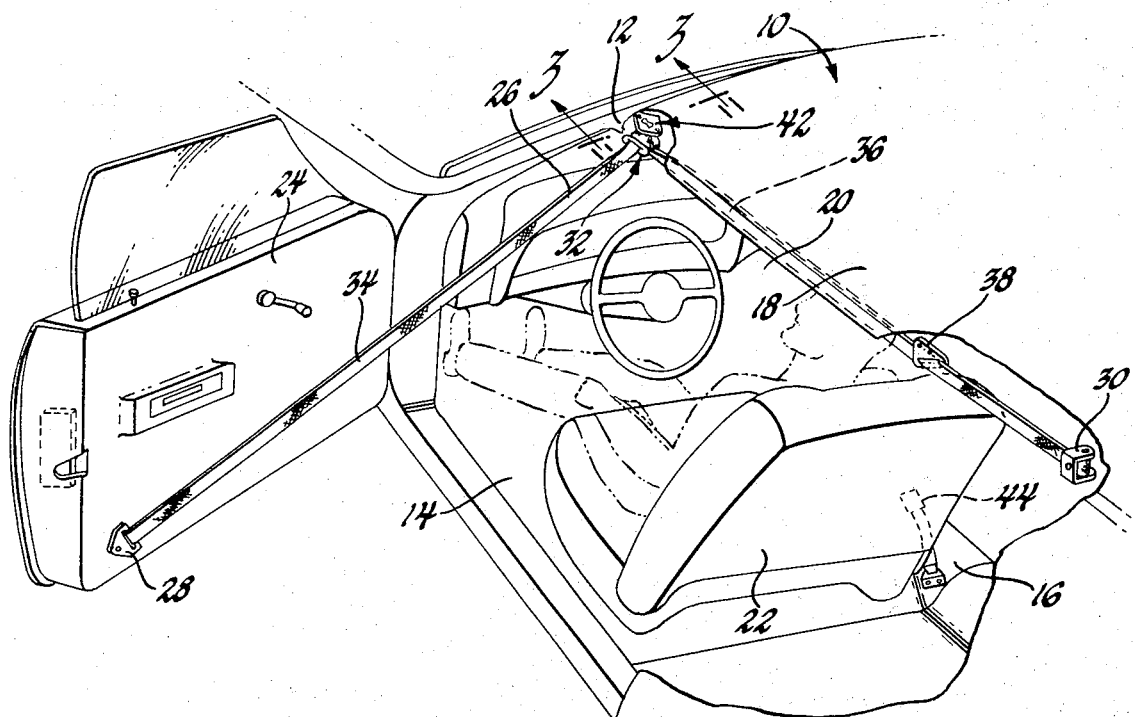
FIG. 1 is a partially broken away perspective view of a portion of a vehicle body including a belt system according to the invention, the vehicle body door being shown in open position and the belt system being shown in easy-enter position.
Figure 2:
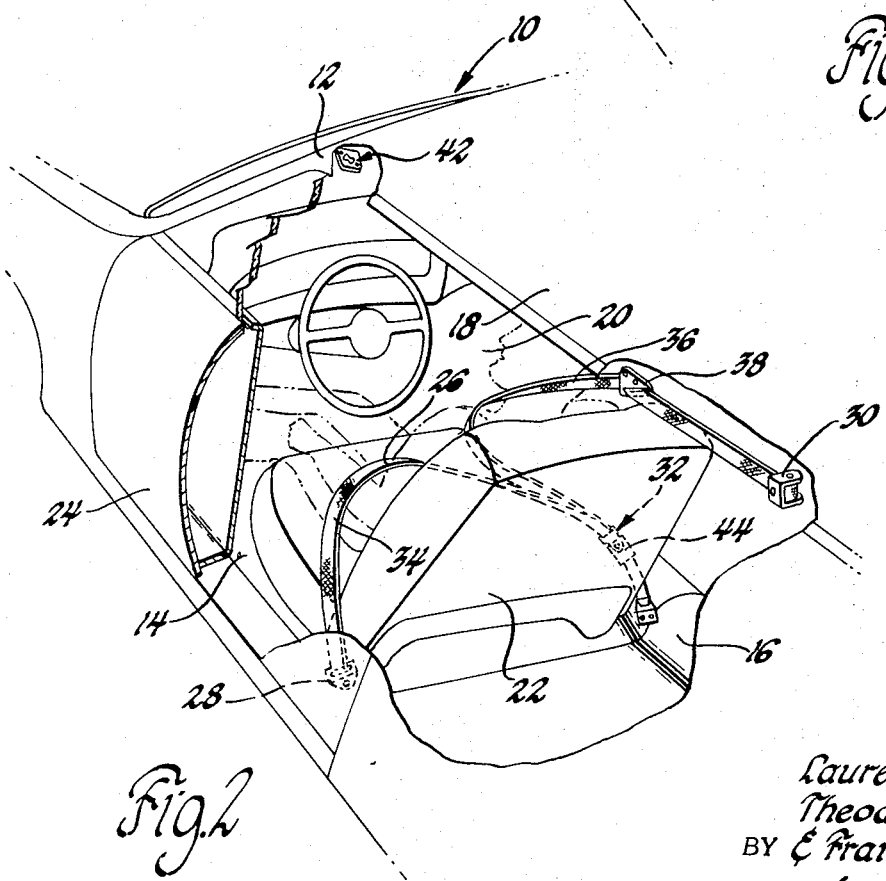
FIG. 2 is a view similar to FIG. 1 showing the door in a closed position and the belt system in an occupant restraining position.

Referring now to the drawings, a vehicle body is generally indicated at 10 and includes a conventional windshield header 12, a vehicle body floor 14 with the conventional transmission tunnel 16, and a roof 18 that cooperate to define an occupant compartment 20 in a conventional manner. A conventional vehicle seat 22 is mounted within the occupant compartment 20 in the usual manner and is accessible through a vehicle body door opening selectively opened and closed by a vehicle body door 24 whose front edge is pivoted to the vehicle body 10 and whose free swinging rear edge is releasably latched to the body.

Figure 3:
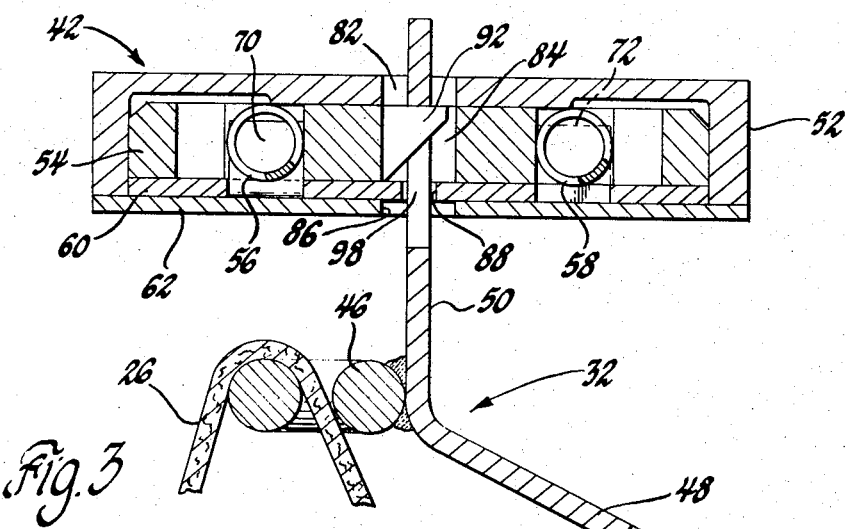
FIG. 3 is a sectional view of the stow latch assembly taken in the direction of arrows 3—3 of FIG. 1.
Figure 4:
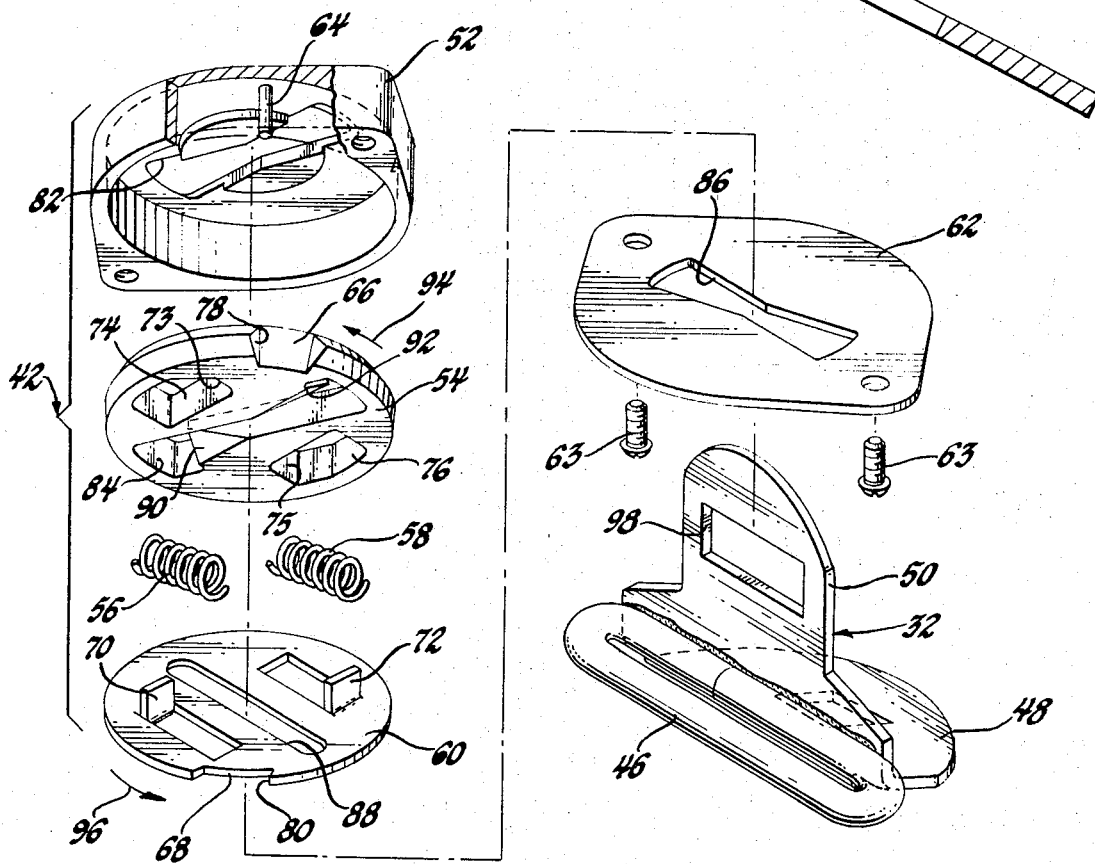
FIG. 4 is an exploded view of the stow latch assembly.

A belt system according to the invention includes a single belt 26, one end of which is secured to the door adjacent the lower free swinging edge thereof by a door attachment 28 and the other end of which is secured to a conventional inertia type retractor 30 mounted on the roof siderail rearward of the seat. Intermediate the door attachment 28 and retractor 30, belt 26 is slidably received through a D-ring assembly 32 to divide the belt into a lap belt portion 34 and a shoulder belt portion 36. As best shown in FIGS. 3 and 4, the D-ring assembly 32 includes an annular ring 46 which slidably receives the belt 26, a first D-ring 48 which is engageable with a buckle 44 mounted on tunnel 16 and a second D-ring 50 which is engageable with a stow latch assembly 42. A guide member 38 attached to the roof siderail just above the seat-back and forwardly of the retractor 30 slidably receives in a guiding manner that portion of shoulder belt 36, intermediate retractor 30 and D-ring assembly 32. The guide member 38 maintains alignment of the shoulder belt 36 with respect to the inertia retractor 30.

The stow latch assembly 42 is attached to the windshield header 12 forward of the seat in the area of the conventional sun visor and can be manually engaged by the D-ring assembly 32 as shown in FIG. 1 to position the belts 34 and 36 in easy-enter positions affording the occupant maximum ease of seat ingress and egress. The stow latch assembly 42 includes a housing 52, latch disc 54, springs 56 and 58, spring disc 60 and a cover plate 62. It may be seen that latch disc 54 and spring disc 60 are journaled for rotation within latch housing 52 when cover plate 62 is attached to the latch housing 52 by screws 63 which also attach the stow latch assembly to the roof 18. A pin 64 is mounted on housing 52 and extends through a cut-out 66 on the circumference of latch disc 54 and a cut-out 68 on the circumference of spring disc 60.

Spring disc 60 is provided with upstanding tabs 70 and 72 which extend into corresponding apertures 74 and 76 provided in latch disc 54. Springs 56 and 58 respectively act between tab 70 and wall 73 of aperture 74 and tab 72 and the wall 75 of aperture 76 and urge the latch disc 54 and spring disc 60 into relative rotational positions wherein the stationary pin 64 is engaged by wall 78 of cutout 66 and wall 80 of cutout 68. With latch disc 54 and spring disc 60 so positioned, bow-tie shaped apertures 82, 84 and 86 provided respectively in housing 52, latch disc 54, and cover plate 62 are rotationally aligned. With spring disc 60 so positioned, a slot 88 provided therein is rotationally aligned with ramped latch teeth 90 and 92 formed on latch disc 54 and extending into the bow-tie shaped aperture 84 thereof.

When the seated occupant desires to move the seat belts 34 and 36 to the easy-enter position, the D-ring 50 of D-ring assembly 32 is manually forcibly inserted through bow-tie shaped aperture 86 of cover plate 62 and the slot 88 of spring disc 60. The end of D-ring 50 engages the ramped surface of latch teeth 90 and 92 causing relative rotation between latch disc 54 and spring disc 60 respectively in the direction of the arrows 94 and 96. When the leading portion of D-ring 50 has been inserted through the bow-tie shaped aperture 82 of the housing 52, the springs 56 and 58 snap the latch disc 54 and spring disc 60 back to their initial rotational positions so that the ramped latch teeth 90 and 92 are thrust through the aperture 98 of D-ring 50, thereby retaining the D-ring assembly 32 and positioning the belt portions 34 and 36 forwardly of the occupant providing maximum ease of seat ingress and egress.

When the occupant enters the passenger compartment and closes the door 24, the end of belt 26 attached to the door is moved to a position adjacent the outboard rear portion of the seat. The occupant then manually disengages the D-ring assembly 32 from the stow latch assembly 42. This disengagement is effected by grasping and rotating the D-ring assembly 32 in the direction of arrow 96 as permitted by compression of springs 56 and 58 and rotation of the spring disc 60. This rotational movement of D-ring assembly 32 carries D-ring 50 out of engagement with the ramped latch teeth 90 and 92. The D-ring 50 can then be pulled downwardly out of the stow latch assembly 42 and the D-ring 48 is then manually inserted into the buckle 44. The inertia retractor 30 retracts belt 26 with the lap belt portion 34 and shoulder belt portion 36 respectively assuming occupant restraining positions across the occupant's lap and chest. The guide member 38 maintains the shoulder belt 36 in alignment with the retractor 30 to prevent binding of the retractor.

It is noted that while in the preferred form of the invention, the retractor 30 is a roof mounted inertia retractor allowing some forward occupant movement, any conventional retractor could alternatively be employed and could be fixed to the door at attachment 28 and receive the lap belt portion 34 while the end of shoulder belt 36 would be fixedly secured to roof siderail of the vehicle. It is also noted that buckle 44 or an equivalent latch member having a D-ring 50 or equivalent stow latch engaging member may alternatively be slidably received on the seat belt 26 while the D-ring 48 or an equivalent latch member is mounted adjacent the inboard portion of the seat.

The seat belt system of this invention may be used in conjunction with a suitable electrical circuit including an occupant actuated seat switch and a D-ring actuated buckle switch so that a warning signal will advise the occupant of his failure to buckle the seat belt.

Thus, the invention provides an improved vehicle occupant restraining belt system.

We claim:

1. In combination with a vehicle body including an occupant compartment and a vehicle seat accessible through a vehicle body door opening selectively opened and closed by a vehicle door, an occupant restraining belt system comprising:
   a belt of predetermined length;
   first attachment means mounting one end of the belt on the door adjacent the free swinging edge thereof; second attachment means mounting the other end of the belt on the vehicle body generally above the door opening and outboard of the seat, one of the first and second attachment means being retractor means;
   a latch member slidably receiving a portion of the belt intermediate the ends to define lap and shoulder belt portions thereof;
   first means mounted on the vehicle body forwardly of the seat and releasably engageable by the latch member to position the lap and shoulder belt portions of the belt in easy-enter positions when the door is open to allow occupant ease of seat ingress and egress; and
   second means mounted on the vehicle body inboard the seat and releasably engageable by the latch member to position the belt in cooperation with the retraction thereof by the retractor means for occupant restraint with the lap belt and shoulder belt portions thereof respectively positioned across the lap and chest of the seated occupant when the door is closed.

2. In combination with a vehicle body including an occupant compartment and a vehicle seat accessible through a vehicle body door opening selectively opened and closed by a vehicle door, an occupant restraining belt system comprising;
   first attachment means located on the door adjacent the free swinging edge thereof and second attachment means located on the vehicle body generally above the door opening and outboard of the seat, one of the first and second attachment means being a retractor;
   a belt having one end mounted on the first attachment means and the other end mounted on the second attachment means;
   a latch member slidably receiving a portion of the belt intermediate the ends to define lap and shoulder belt portions thereof, the latch member including a D-ring having an aperture;
   means mounted on the vehicle body adjacent the seat and releasably engageable with the latch member to position the belt in cooperation with retraction thereof by the retractor means in an occupant restraining position with the lap belt and shoulder belt portions thereof respectively positioned across the lap and chest of the seated occupant when the door is closed; and
   stowage means mounted on the vehicle body forwardly of the seat and including spring-biased teeth which are releasably engageable in the aperture of the D-ring when the latch member is inserted therein to hold the lap and shoulder belt portions of the belt in easy-enter position.

* * * * *